No. 876,923. PATENTED JAN. 21, 1908.
E. F. W. ALEXANDERSON.
STARTING MOTOR CONVERTER.
APPLICATION FILED MAY 31, 1907.
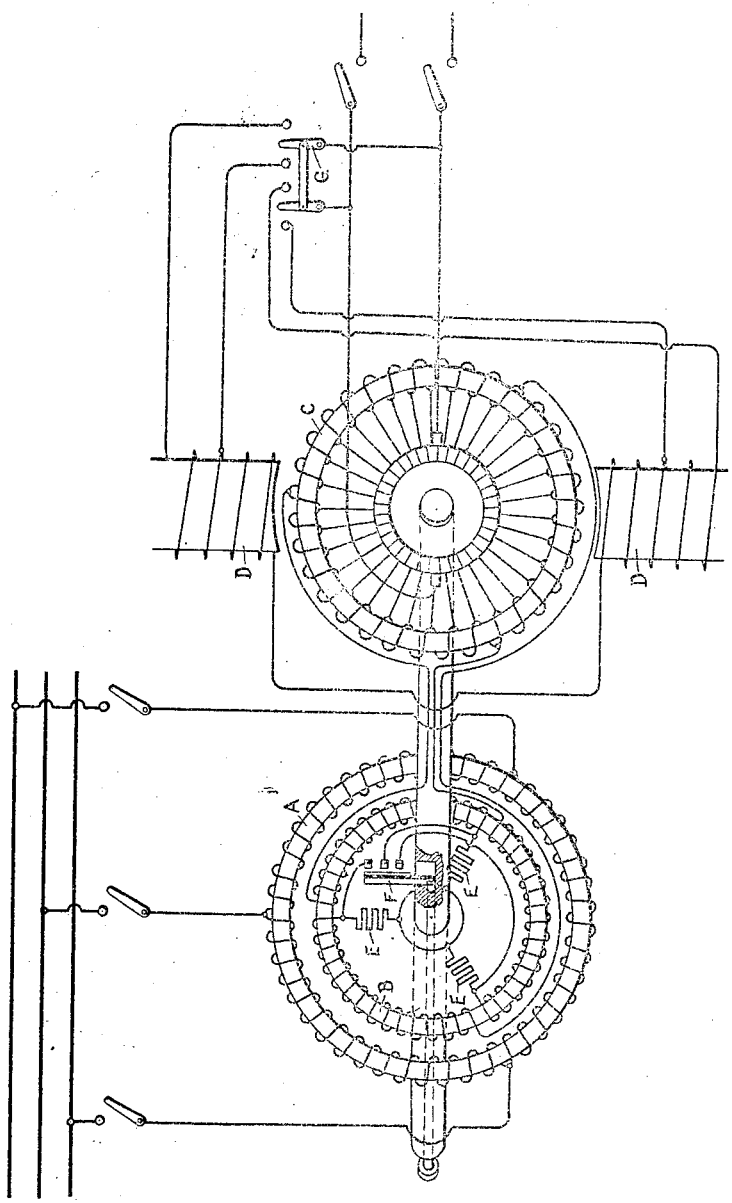
WITNESSES
INVENTOR
ERNST F. W. ALEXANDERSON,
BY
ATT'Y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

STARTING MOTOR-CONVERTER.

No. 876,926.

Specification of Letters Patent.

Patented Jan. 21, 1908.

Application filed May 31, 1907. Serial No. 376,648.

*To all whom it may concern:*

Be it known that I, ERNST F. W. ALEXANDERSON, a citizen of the United States, residing at Schenectady, county of Schenectady, State of New York, have invented certain new and useful Improvements in Starting Motor-Converters, of which the following is a specification.

My invention relates to motor converters of the well known type comprising an induction motor and rotary converter with their armatures mechanically and electrically coupled. Such a set, as is well understood in the art, runs at a speed corresponding to the sum of the pole numbers of the two machines. In starting such a set it is customary to insert a resistance in the armature circuit, as in starting an induction motor, and to connect the field winding of the rotary converter to its commutator brushes. The field winding is thereby subjected at starting to an alternating potential which decreases in frequency as the speed increases; becoming unidirectional when the normal operating speed is reached. If the field of the rotary converter were not excited and if the starting resistance were not carefully adjusted, the induction motor would tend to reach a speed higher than normal and determined by the number of the poles of the induction motor only. But if, in passing normal speed, the field of the rotary converter is properly excited, the motor converter will drop into synchronism at that speed.

In order to avoid the use of collector rings, it is often advantageous to mount the resistance on the armature of the induction motor. In such a case a simple short-circuiting switch is desirable so that adjusting the speed by adjusting the resistance becomes impracticable. It may then be found in operation that the field of the rotary converter does not become sufficiently excited at reaching normal speed to hold the set at that speed, but allows the speed still further to increase.

My invention consists in providing starting means adapted to insure sufficient field magnetization on reaching normal speed to hold the set at that speed. I accomplish this by providing means for reducing the effective number of field turns of the rotary converter and providing a switch for cutting out a portion of the field winding at starting. Since the amount of magnetization reached by the field of the rotary converter for an impressed potential impulse of a given duration is dependent on the self-induction of the field winding, which in turn is proportional to the square of the number of turns, reducing the effective number of turns of the field winding, materially assists in increasing the rapidity with which the field winding builds up its magnetization.

My invention will best be understood by reference to the accompanying drawing, which shows diagrammatically a rotary converter provided with starting means arranged in accordance with my invention.

A represents the primary member of the induction motor, which I have shown arranged for operation from a three-phase source of supply. B represents the rotor, which is also provided with a three-phase winding, connected in series with the armature C of a rotary converter; which winding is provided with the usual commutator.

D represents the field magnet of the rotary converter.

E represents a starting resistance carried by the rotor B and connected in series with the armatures of the two machines. F represents a short-circuiting switch for the resistance, also carried by the rotor B.

G represents a double-throw switch which, when moved to the right, connects the entire field winding across the commutator brushes of the rotary converter, and when thrown to the left cuts out a portion of the field winding.

In starting the motor converter, the direct-current load-circuit supplied from the commutator of the rotary converter is open; switch F is open, introducing resistance E into the armature circuit, switch G is thrown to the left, and the primary winding A is then connected to the source of supply. The set then starts like an ordinary induction motor, the secondary member B having its circuit closed through the armature C and starting resistance E in series. Since switch G is thrown to the left, it connects a portion only of the field winding of magnet D to the commutator brushes. An alternating potential is impressed on this portion of the field winding, which diminishes in frequency as the speed increases. Since the set is running light, it would tend to pass above its normal speed, were it not for the fact that as the set approaches its normal speed and the voltage impressed on the field magnet D diminishes in frequency and finally becomes unidirectional, the magnetization of the field magnet builds up sufficiently to lock the motor converter at its normal speed when that speed is reached. The reduction in the effective number of field turns of the rotary converter by cutting out a portion of the winding assists materially in enabling it to build up its magnetization fast enough to hold the converter at normal speed. As soon as the converter is operating at normal speed, switch G is thrown to the right, so as to connect the entire field winding in circuit, switch F is closed, short-circuiting resistance E, and the direct-current load-circuit may then be closed.

It will be understood that I have illustrated my invention diagrammatically for the sake of simplicity, and that in practice any well known constructions may be employed for the machines and controlling devices.

What I claim as new and desire to secure by Letters Patent of the United States, is,—

1. In combination with a motor-converter comprising an induction motor and rotary converter mechanically and electrically coupled, means for reducing the effective number of turns of the field winding of the rotary converter at starting.

2. In combination with a motor-converter comprising an induction motor and rotary converter with armatures mechanically coupled and electrically connected in series, a starting resistance in series with said armatures, a short-circuiting switch therefor, and means for reducing the effective number of turns of the field winding of the rotary converter at starting.

3. In combination with a motor-converter comprising an induction motor and rotary converter mechanically and electrically coupled, a switch arranged to cut out a portion of the field winding of the rotary converter at starting.

4. In combination with a motor-converter comprising an induction motor and rotary converter with armatures mechanically coupled and electrically connected in series, a starting resistance carried by said armatures and connected in series with the armature windings, a short-circuiting switch therefor, and means for reducing the effective number of turns of the field winding of the rotary converter at starting.

In witness whereof, I have hereunto set my hand this 29th day of May, 1907.

ERNST F. W. ALEXANDERSON.

Witnesses:
BENJAMIN B. HULL,
HELEN ORFORD.